Aug. 12, 1958
G. C. CROWLEY ET AL
2,847,546
VAPORIZER STEAM DRY CONTROL
Filed May 28, 1957
2 Sheets-Sheet 1
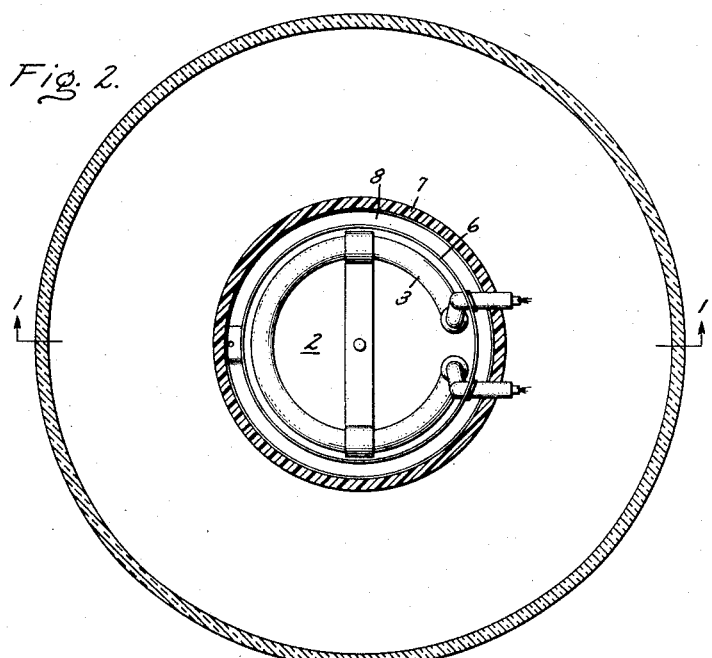
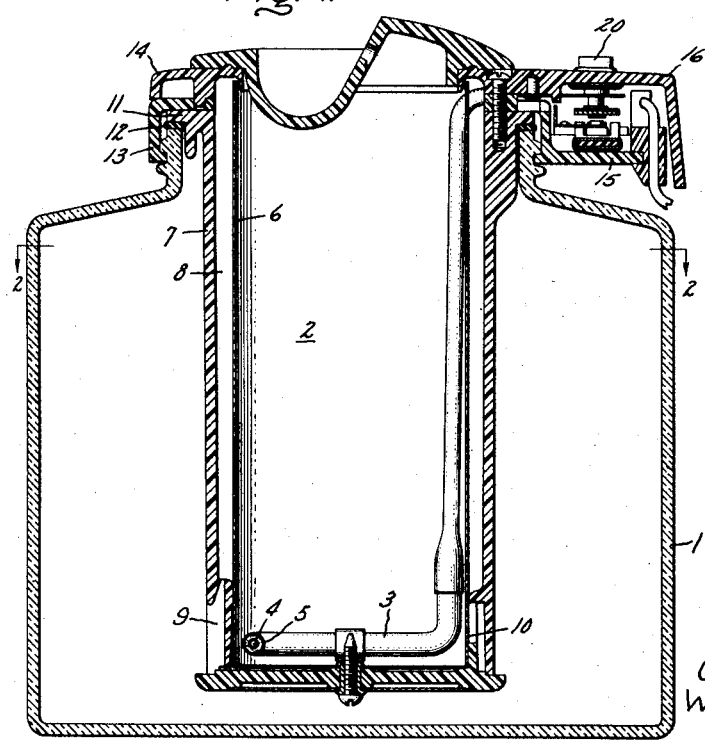
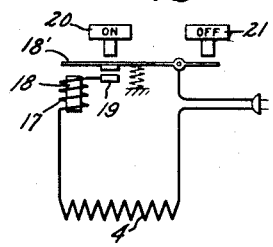
Inventors:
George C. Crowley,
Walter H. Gordon Jr.,
Robert A. Wise,
by Laurence R. Kempton
Their Attorney.

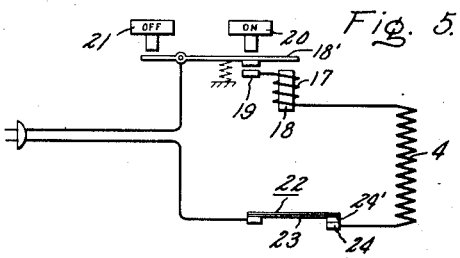
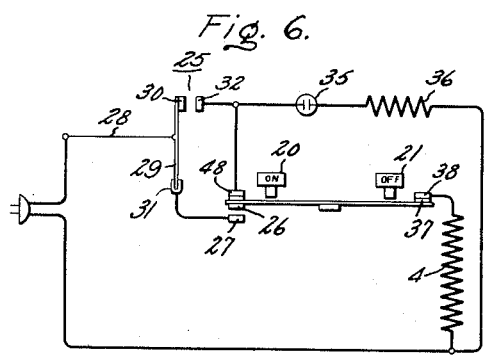
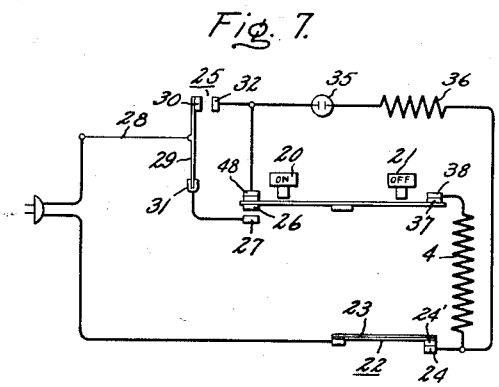
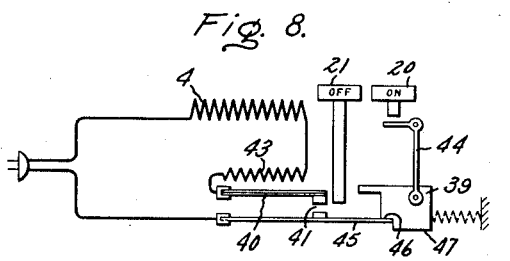
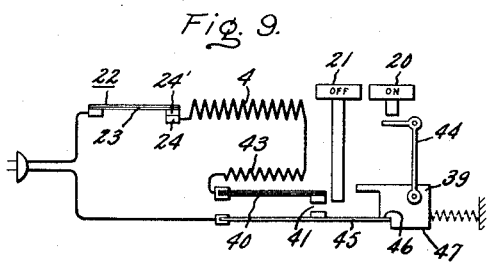
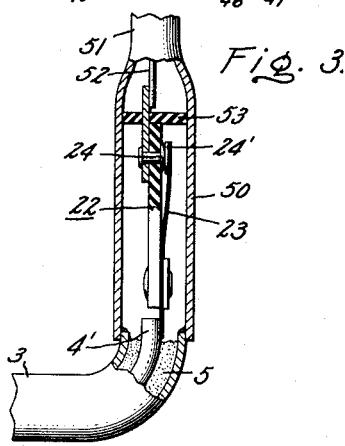

United States Patent Office 2,847,546
Patented Aug. 12, 1958

2,847,546

VAPORIZER STEAM DRY CONTROL

George C. Crowley, Walter H. Gordon, Jr., and Robert A. Wise, Asheboro, N. C., assignors to General Electric Company, a corporation of New York Application May 28, 1957, Serial No. 662,254

5 Claims. (Cl. 219—38)

This invention relates to steam vaporizers and in particular, to the control circuit for such vaporizers.

One object of this invention is to provide a control circuit for a vaporizer which will disconnect the vaporizer when the vaporizer runs dry.

A further object of this invention is to provide a vaporizer with a control circuit which will not only disconnect the vaporizer from the power supply when the vaporizer runs dry, but will also maintain the control circuit in an open condition until the circuit is manually reset.

Other objects and advantages of our invention will become apparent as the following description proceeds, and the features of novelty which characterize our invention will be pointed out with particularity in the claims annexed to and forming part of this specification.

In carrying out the objects of our invention in one form, the electric vaporizer heating element is normally immersed in liquid, with its temperature limited by the vaporization temperature of such liquid. When all the liquid has been vaporized, a sharp rise in temperature of the heating element occurs. In the heating element circuit is a normally open switch with means for manual closure, and current sensitive means for maintaining the switch closed during the subsequent normal operation. The heating element is constructed to be sensitive to the sharp rise in temperature when the liquid has been substantially entirely vaporized, thereby to cut off or materially reduce current flow through the current sensitive means. Thereupon the switch returns to its normally open position, and the vaporizer is completely deenergized.

For a better understanding of our invention, reference may be made to the accompanying drawings in which:

Fig. 1 is a sectional elevation taken along line 1—1 of Fig. 2;

Fig. 2 is a sectional plan view taken along line 2—2 of Fig. 1;

Fig. 3 is a sectional view of the thermostat installation in the heater;

Fig. 4 is a wiring diagram of one embodiment of the control circuit;

Fig. 5 is a wiring diagram of a second embodiment of the control circuit;

Fig. 6 is a wiring diagram of an alternate form of the control circuit shown in Fig. 4;

Fig. 7 is a wiring diagram of an alternate form of the control circuit shown in Fig. 5;

Fig. 8 is a wiring diagram of an alternate form of the control circuit shown in Fig. 4; and Fig. 9 is a wiring diagram of an alternate form of the control circuit shown in Fig. 5.

Referring to the drawings, we have shown an embodiment of our invention wherein the vaporizer includes an outer container 1 of substantial volume; for example, one gallon. With such a large quantity of water as this, however, it is desirable to provide a means for vaporizing the liquid which will not necessitate heating the entire quantity of liquid in outer container 1 to the boiling point. Therefore, for this purpose we have provided a liquid vaporization chamber 2 adapted to be positioned within container 1. Within chamber 2 is a heating element 3, preferably comprising an electric resistor 4 sealed within an outer protective sheath 5, with the electrical resistor insulated from the outer sheath in a well known manner. In the particular form shown, chamber 2 is defined by spaced tubular walls 6 and 7, the lower portion of the chamber being similarly closed by spaced bottom wall. The intermediate air space 8 functions as thermal insulation between chamber 2 and the liquid in container 1.

The steam generating chamber is so arranged with respect to the outer container that a limited quantity of liquid is present in chamber 2 regardless of the level of liquid in outer container 1. As shown, a passage water inlet opening 9 is formed in wall 7 adjacent the bottom thereof. Water from container 1 passes through inlet 9 and between walls 6 and 7 around the lower portion of wall 6 where it enters chamber 2 through inlet 10. However, to prevent the liquid from rising in chamber 2 to the same level as the liquid in the outer container 1, we provide means for sealing the outer container thereby to create a level controlling vacuum in container 1. As shown, outer wall 7 of chamber 2 includes an outwardly extending circuit flange 11 adapted to rest on the upper edge of container 1. Preferably, an appropriate sealing gasket 12 is interposed between flange 11 and the upper edge of container 1. Cover flange 11 and the outer container may then be secured and sealed in assembled relation by a clamping ring 13 which is secured to flange 11. Secured above clamping ring 13 is a cover ring 14. In order to provide a housing for control of the vaporizer, clamping ring 13 is formed with an outwardly extending flange 15 and cover ring 14 is formed with an outwardly and downwardly extending flange 16. The space then defined by flanges 15 and 16 is utilized to house the controls.

The vaporizer as thus far described forms no part of the present invention but constitutes the invention which is the subject matter of a separate application, Serial No. 662,256 filed concurrently herewith in the names of Walter H. Gordon, Jr., and Robert A. Wise, entitled "Vaporizer," assigned to General Electric Company as is the instant application.

In accordance with this invention, the vaporizer is provided with a control circuit, one embodiment of which is shown in Fig. 4. Heating element resistor 4 is connected in series relationship with a relay coil 17 wound about relay core 18, armature 18', and switch 19. An "on" button 20 is positioned so as to close the circuit by the switch 19 and an "off" button 21 is positioned so as to de-energize the circuit manually. While we have shown mechanical means for closing the switch, obviously switch 19 could be actuated to closed position electrically if desired. The relay is of the current type, biased in any suitable manner to a normally open position, so that when the circuit is made, the magnetic relay consisting of coil 17, core 18 and armature 18' holds the switch 19 closed until either the "off" button is depressed or the circuit is de-energized upon a decrease in current flow through coil 17. In this embodiment, the heater resistor 4 is wound with a material which has a positive temperature co-efficient of resistance. When all the liquid has been vaporized, the operating temperature of resistor 4 rises sharply. The corresponding increase in resistance of the heater decreases the current flowing through relay coil 17. The decreased current flowing through the relay coil will weaken the magnetic attraction and permit the armature to move away from the core, thereby opening switch 19. This opening of the circuit will prevent current from flowing through the circuit and the circuit remains de-energized until the magnetic relay is reset by depressing the "on" button 20.

A second embodiment of our invention is shown in Fig. 5 wherein the relay and heating element are connected in series relationship and a thermostat is also connected in series with these other two circuit elements. In such a circuit, we provide thermostat over-heat protection with magnetic lock-out. When "on" button 20 is depressed, it closes switch 19 permitting current to flow through the relay coil, heating element, bimetal, and thermostat contacts. When the vaporizer boils dry, the temperature of resistor 4 increases and such increase is detected by the thermostat 22. The increase in temperature of the thermostat bimetal causes it to deflect, opening the thermostat contacts and interrupting the flow of current through the heater relay coil and thermostat, thereby causing the relay to become de-energized, opening switch 19. When the heater cools, the bimetal of the thermostat will also cool, permitting the thermostat to re-close. The circuit through the vaporizer, however, will not be complete because switch 19 will remain open until the "on" button is depressed. This happens because even though thermostat contacts re-close, no current will be able to flow through relay coil 17 which in turn would close switch 19. The circuit can be manually de-energized by depressing "off" button 21 which will open contacts 19 and prevent current from flowing through the circuit.

The thermostat 22 is shown most clearly in Fig. 3. This shows the mounting of the thermostat within the bulged portion 50 of the tubular member 51 through which pass the wires 52. One end of the thermostat 22 is connected to the heater resistor terminal 4' and the opposite end is connected to wire 52. A bushing 53 is incorporated to properly position the thermostat 22 within housing member 50 so that no contact will be made with housing member 50. As can be seen in Fig. 3, thermostat 22 forms a portion of the heating element 3 in connection with heater resistor terminal 4'.

Our invention as shown in Fig. 6 utilizes a hot wire relay for over-heat protection. The circuit is energized by momentarily closing contacts 26 and 27, normally biased open, so that current will flow through hot wire 28, contacts 26 and 27, contacts 37 and 38, and resistor 4. While contacts 26 and 27 are still held closed, hot wire 28 will elongate due to its temperature co-efficient of linear expansion. This permits pivot arm 29 which carries contact 30 to move to the right about pivot point 31 so that contact 30 will engage contact 32. Contact 32 provides a circuit through neon lamp 35 and resistor 36 thereby causing said lamp to light. The "on" button must be depressed during this time, and when the circuit is complete through the neon lamp 35 and its associated resistor 36, energization of the lamp indicates to the operator that the "on" button need no longer be depressed, and contacts 26 and 27 will then be disengaged and normally closed contacts 26 and 48 will be engaged to retain heater 4 in the circuit through hot wire 28 in parallel circuit with the lamp circuit. When the vaporizer boils dry, the positive temperature co-efficient of reistance heater 4 will increase in resistance, thus decreasing the current through the hot wire 28. This decreased current through hot wire 28 lowers the temperature of hot wire 28 causing the wire to contract thereby moving pivot arm 29 to the left opening switch 25 and contacts 30 and 32. This opening of the circuit will prevent current from flowing through resistance heater 4 and lamp 35, and the circuit cannot be re-energized until the "on" button is depressed thereby closing contacts 26 and 27 which in turn will re-set the hot wire relay. The vaporizer circuit may be manually de-energized by depressing the "off" button 21 opening normally closed contacts 37 and 38. The opening of contacts 37 and 38 opens the circuit to heater 4 reducing the current through hot wire 28 causing it to cool, and thereby causing pivot arm 29 to move to the left opening switch 25 and contacts 30 and 32. Lamp 35 will remain on during the operation until switch 25 opens to indicate the circuit is de-energized, and if the circuit is being manually de-energized, lamp 35 going out indicates that the operator need no longer depress "off" button 21. It should be realized that this circuit could also be constructed so as to have a momentary "on" position such as previously described but a positive "off" position. For example, the circuit and associated switches could be constructed so that when contacts 37 and 38 are opened, they will remain opened until the "on" button 20 is again depressed.

Fig. 7 shows a circuit which is quite similar to the circuit shown in Fig. 6. However, the circuit shown in Fig. 7 utilizes thermostat over-heat protection with a hot wire relay for lock-out purposes. The circuit operates in the same manner as the circuit shown in Fig. 6 with the exception of the thermostat 22. This thermostat consists of a bimetal 23 and contacts 24 and 24'. When the vaporizer boils dry, heater resistance 4 increases in temperature and bimetal 23 will also increase in temperature and will therefore deflect. This deflection of bimetal 23 will open contacts 24 and 24' interrupting the current through heater resistance 4, reducing the current flowing through hot wire 28. This reduction of current will cause hot wire 28 to cool so that it will contract causing pivot arm 29 to move to the left, thereby opening switch 25 and contacts 30 and 32. When the heater resistance 4 cools, bimetal 23 will also cool, returning to its normal position so that contacts 24 and 24' will again be closed. Current through heater resistance 4, however, cannot be restored until the "on" button is depressed closing contacts 26 and 27, thereby re-setting the hot wire relay. This circuit can be de-energized in the same manner as the circuit shown in Fig. 6.

Another form of our control circuit is shown in Fig 8 which has a thermal over-heat protective device consisting of positive temperature co-efficient of resistance heating element 4, latch 39, bimetal 40, bimetal heater 43 and switch 41 normally biased open by latch 39. To energize the circuit, "on" button 20 is depressed, which through linkage 44 moves latch 39 to the right permitting spring arm 45 to move upward to close switch 41. This then completes a circuit through switch 41, bimetal 40, bimetal heater 43 and heater resistance 4. When this portion of the circuit has been completed, heater 43 begins to heat up and will deflect bimetal 40 downward which in turn deflects spring arm 45 downward until spring arm 45 is engaged with surface 46 of latch 39. Switch 41, however will remain closed during this time. When the vaporizer boils dry, heater resistance 4 becomes hot and due to the positive temperature co-efficient of the resistance, its resistance increases reducing the current through resistance 4 and heater 43. The reduction of heat dissipation in heater 43 will permit bimetal 40 to cool and cause it to deflect upward. Since spring arm 45 is engaged with surface 46, it is prevented from moving upward when bimetal 40 moves upward. At that time, due to this action, switch 41 will open and interrupt flow of current through heater resistance 4 and heater 43. The circuit will remain de-energized until latch 39 is manually moved to the right to permit switch 41 to reclose. To manually de-energize the vaporizer, "off" button is depressed which will move spring arm 45 downward until it engages surface 47 of latch 39. This action opens switch 41 interrupting the current flowing through bimetal heater 43 and resistance heater 4.

The circuit disclosed in Fig. 9 is practically the same circuit as that disclosed in Fig. 8 with the addition of thermostat 22. It can therefore, be seen that this circuit utilizes a thermostat for over-heat protection in conjunction with a thermal lock-out device. When the vaporizer boils dry, heat from heating resistor 4 will cause bimetal 23 to deflect opening contacts 24 and 24' which will interrupt the flow of current through heater resistance 4 and bimetal heater 43. When this happens the bimetal 40 cools causing it to deflect upward thereby opening switch 41, and since spring arm 45 is engaged with surface 46 of latch 39, the circuit will remain in open condition until latch 39 is manually moved to the right thereby allowing switch 41 to reclose. This circuit can be de-energized in the same manner as the circuit shown in Fig. 8 by manually pushing spring arm 45 downward by means of "off" button 21 until spring arm 45 engages surface 47 of latch 39. This action opens switch 41 thereby interrupting the flow of current through heater resistance 4 and bimetal heater 43.

While we have shown and described a specific embodiment of our invention, we do not desire our invention to be limited to the particular construction shown and described and we intend by the appended claims to cover all modifications within the spirit and scope of our invention.

What we claim as new and desire to secure by Letters Patent of the United States is:

1. A liquid vaporizer comprising an electric heating element having a positive temperature coefficient of resistance normally immersed in liquid in said vaporizer with the heating element temperature limited by the vaporization temperature of the liquid; said heating element temperature rising sharply when all the liquid has been vaporized; a switch biased to a normally open position; manually operable means for closing said switch; electrically operable means effective when fully energized to maintain closure of said switch; said heating element, switch and electrically operated means being connected in a series electrical circuit to maintain said electrically operable means fully energized when said heating element is immersed in the liquid; the change in resistance of said heating element being effective upon a sharp rise in heating element temperature to reduce current flowing through said electrically operated means; thereby to release said switch to its normally open position.

2. The combination recited in claim 1 wherein said electrically operable means is a current sensitive relay.

3. A liquid vaporizer comprising an electric heating element normally immersed in the liquid to be vaporized with the heating element temperature limited by the vaporization temperature of the liquid; a switch biased to a normally open position; manually operable means for closing said switch; a current sensitive relay effective when fully energized to maintain closure of said switch, said heating element, switch and relay connected in a series electrical circuit; and a thermostat effective upon sharp rise in heating element temperature to reduce current flow through said relay, thereby to release said switch to its normally open position.

4. A liquid vaporizer comprising an electric heating element having a positive temperature coefficient of resistance normally immersed in the liquid to be vaporized with the heating element temperature limited by the vaporization temperature; a switch biased to a normally open position; manually operable means for closing said switch; electrically operable means effective when fully energized to maintain closure of said switch; said heating element, switch and electrically operated means being connected in a series of electrical circuit to maintain said electrically operable means fully energized when said heating element is immersed in liquid; the change in resistance of said heating element being effective upon a sharp rise in heating element temperature to reduce current flowing through said electrically operated means; thereby to release said switch to its normally open position.

5. The combination recited in claim 4 wherein said electrically operable means is a current sensitive relay.

References Cited in the file of this patent
UNITED STATES PATENTS

| 2,700,724 | Lynch | Jan. 25, 1955 |
| 2,722,595 | Kolb | Nov. 1, 1955 |